May 15, 1923.
A. D. WYCKOFF ET AL
1,455,184
LIQUID MEASURING AND DISPENSING APPARATUS
Filed Jan. 5, 1921  2 Sheets-Sheet 1
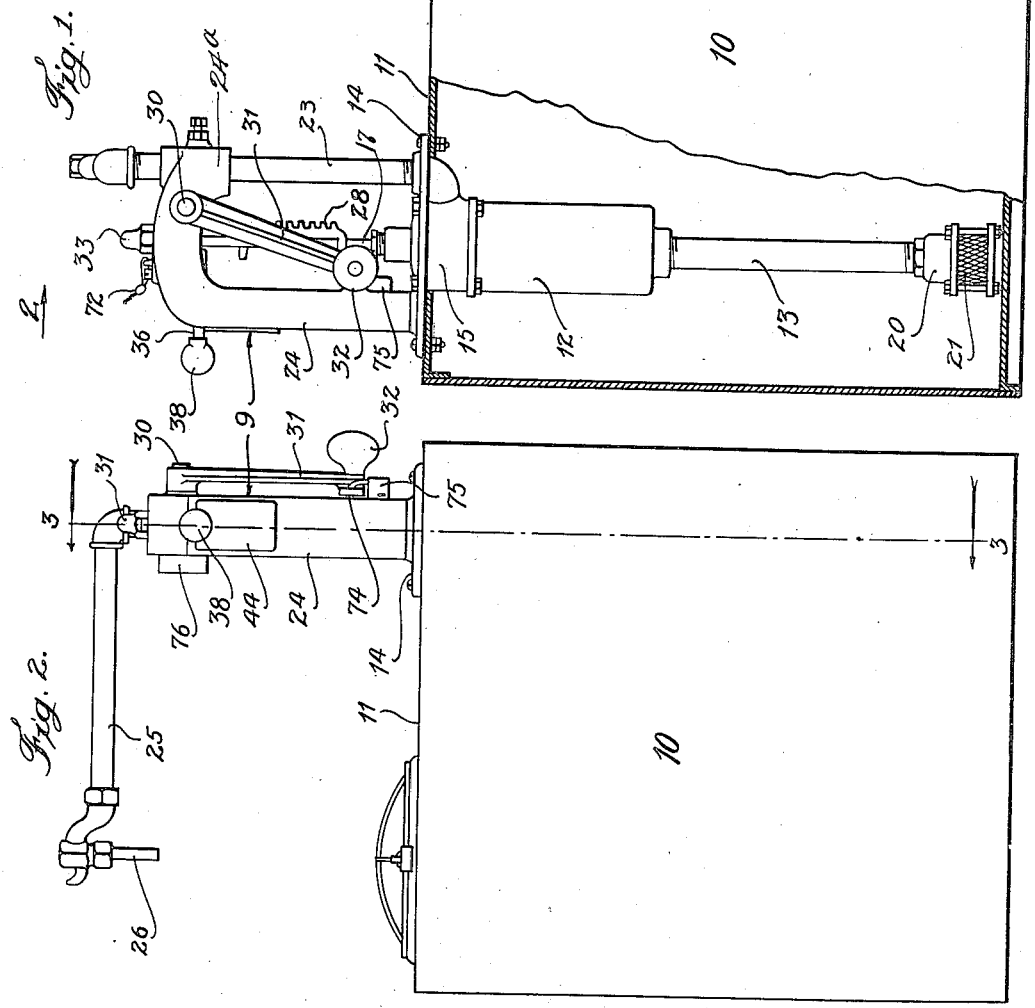

May 15, 1923.
A. D. WYCKOFF ET AL
LIQUID MEASURING AND DISPENSING APPARATUS
Filed Jan. 5, 1921
1,455,184
2 Sheets-Sheet 2
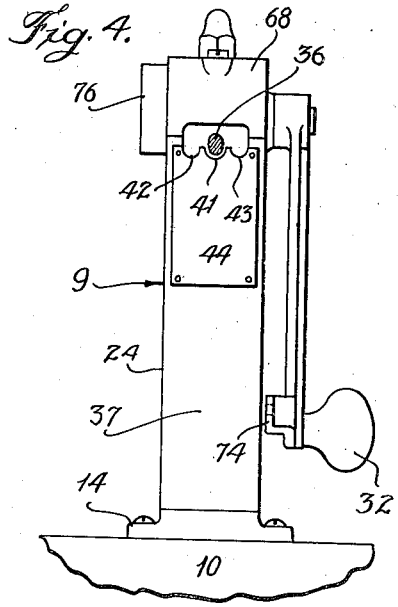
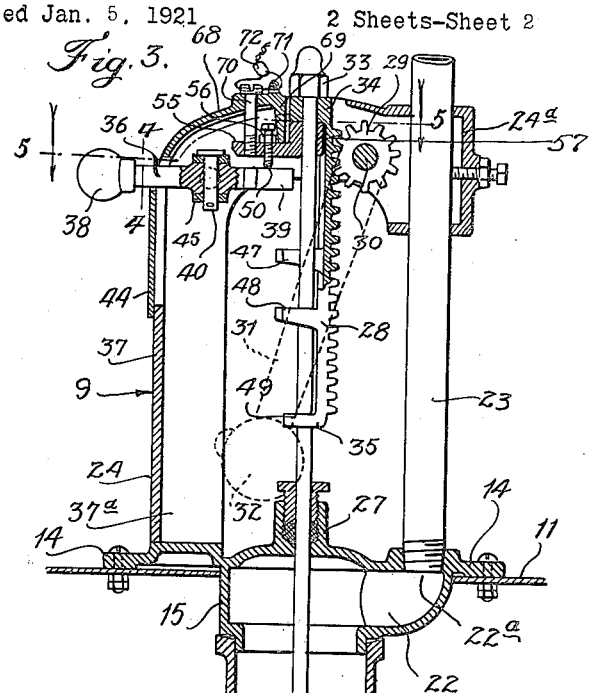
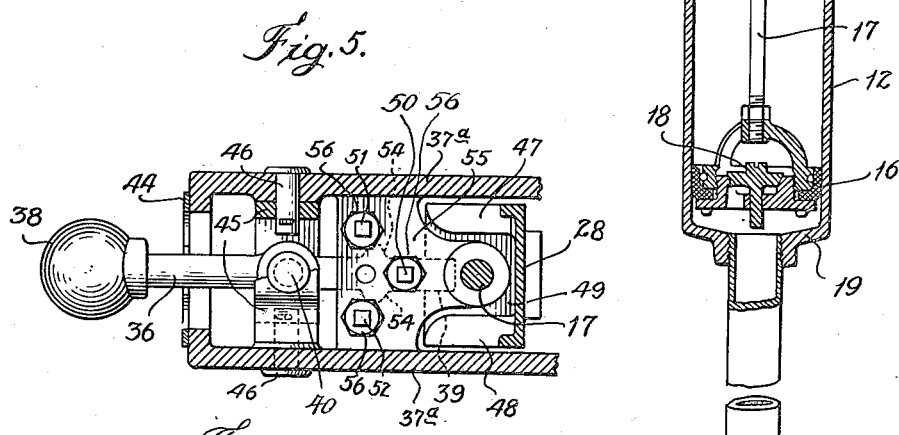
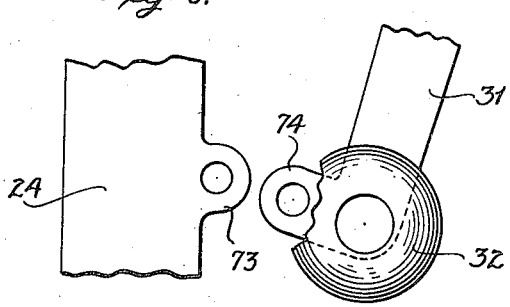

Patented May 15, 1923.

1,455,184

UNITED STATES PATENT OFFICE.

ANDREW D. WYCKOFF, OF MAYWOOD, ILLINOIS, AND HOWARD P. DE CORREVONT, OF CHICAGO, ILLINOIS, ASSIGNORS TO OIL PRODUCTS APPLIANCE CO., OF MAYWOOD, ILLINOIS, A CORPORATION OF ILLINOIS.

LIQUID MEASURING AND DISPENSING APPARATUS.

Application filed January 5, 1921. Serial No. 435,127.

*To all whom it may concern:*

Be it known that we, ANDREW D. WYCKOFF, a citizen of the United States, and a resident of Maywood, Cook County, and State of Illinois, and HOWARD P. DE CORREVONT, a citizen of the United States, and a resident of Chicago, Cook County, and State of Illinois, have invented certain new and useful Improvements in Liquid Measuring and Dispensing Apparatus, of which the following is declared to be a full, clear, and exact description.

This invention relates to liquid measuring and dispensing apparatus, and its principal object is to provide a simple, efficient and practical apparatus for measuring liquids, such as oils, and dispensing them from a tank or reservoir. Another object is to provide, in a liquid measuring and dispensing apparatus, simple means for adjusting the quantity setting means, to thereby accurately measure and dispense various predetermined quantities of oils or other liquids. Another object is to provide liquid measuring and dispensing apparatus which shall be proof against unauthorized manipulation and whereby the adjustment devices for the setting means may be locked against any tampering by unauthorized persons.

In service stations, and other places where oil or other valuable liquids are dispensed from a tank, it is necessary to guard against dishonest persons, and against unauthorized persons from tampering with the measuring and adjustment mechanism and from drawing liquid without authority. It is also necessary that an accurate account be kept of the amount of liquid dispensed. It is also necessary to accurately measure the liquid dispensed and it is desirable to combine the operation of measuring and dispensing thereof by one manipulation of an operating element. The present invention has been designed to accomplish all of these necessary and desirable results, and one of the objects of this invention is to provide a simple, comparatively inexpensive, substantial and practical apparatus for producing these results. The invention consists in the several novel features hereinafter fully set forth and claimed.

The invention is clearly illustrated in the accompanying drawings, in which:—

Fig. 1 is a side elevation of a tank or reservoir, broken out, and illustrating a simple embodiment of the present invention applied thereto; Fig. 2 is an end view looking in the direction of the arrow 2 in Fig. 1; Fig. 3 is a vertical, longitudinal section taken on the line 3—3 of Fig. 2; Fig. 4 is an end elevation of the pump head of the apparatus, showing a certain setting lever in cross section, the line of section being taken on the line 4—4 of Fig. 3; Fig. 5 is a horizontal section taken on the line 5—5 of Fig. 3; and Fig. 6 is a side elevation of fragments of the standard or arm of the pump head and an operating crank.

Referring to said drawings, the reference character 10 designates a tank or receptacle for containing the oil or other liquid which is to be measured and dispensed therefrom. The apparatus forming the subject matter of this invention comprises a pump head 9 which is supported upon the top 11 of the tank, and an associated measuring cylinder 12 and suction pipe 13 which are contained in the tank. The pump head has a base plate 14 which is bolted or otherwise secured to the top 11 of the tank, and said base plate is formed with a downwardly projecting chambered part, 15, which opens to the measuring cylinder 12, and these two parts are fitted to each other and bolted or otherwise securely fastened together. In the measuring cylinder 12 is a plunger 16 of suitable construction and provided with the usual cup washer, which plunger is supported by and operated by a plunger stem 17. The plunger is provided with an upwardly opening check valve 18, which may seat upon a valve seat in the plunger head, solely by gravity. The measuring cylinder 12 is provided on its lower end with an end wall 19 in which is secured the suction pipe 13. Said suction pipe is provided on its lower end with an upwardly opening check valve mechanism 20 and the inlet opening to said check valve mechanism 20 may be protected by a screen 21, as shown, to guard against the entrance of foreign matter to and through the measuring and dispensing apparatus.

Said base plate 14 is further formed with a passageway 22, which leads from the chambered part 15 to a discharge opening 22ª, and a discharge pipe 23 is screwed into said discharge opening and leads up through a branch 24ᵃ of the standard 24 of the head 9, and terminates in the delivery pipe arm 24 which is provided with the usual goose neck discharge spout or nozzle 26, as is common in oil measuring and dispensing pumps.

The base plate 14 is provided above the chambered part 15, with a stuffing box 27, through which the plunger stem 17 extends, and at the top of the arm 24 is a guide bearing 57 for the upper end of said plunger stem. To said end of the plunger stem is secured a rack bar 28, that meshes with a pinion 29 fast on a shaft 30, which is rotatively mounted in the branch 24ᵃ of the bracket or arm 24 and has an operating crank 31 secured upon its outer end, whereby it is rotated to operate the suction mechanism of the apparatus. The crank 31 has a handle or knob 32 upon its outer end by means of which it may be turned. A nut 33, threaded upon the upper end of the plunger stem 17 bears against a lug 34 formed upon the upper end of the rack bar 28 and connects the plunger stem 17 with the rack bar. The lower end of the rack bar is formed with a transversely extending lug or ear 35, that surrounds the plunger stem and connects the lower end of the rack bar therewith. Liquid dispensed from the tank, is measured by displacing a quantity thereof in the measuring cylinder 12, and the amount, displaced, is controlled by regulatable measuring mechanism which will now be described.

Supported in the hollow of the standard or arm 24 is a setting lever 36 which projects out through an opening in the end wall 37 of the standard, and has a knob 38 upon its outer end whereby it may be manipulated. Said setting lever 36 has an arm 39, which is arranged to be engaged by any one of a number of shoulders 47, 48, 49, of the rack bar, to thereby arrest upward movement of said rack bar, and therewith upward movement of the plunger, thus determining the length of stroke of the plunger and consequently the volume of liquid displaced from the measuring cylinder 12. Said setting lever 36 is capable of being adjusted to various positions, whereby its arm 39 may be adjusted to occupy positions in the path of movement of the shoulders 47, 48, 49, depending upon the quantity of liquid it is desired to measure and dispense. Said setting lever is illustrated as fulcrumed upon a vertically extending pin 40, whereby it may be swung through a horizontal plane, and means are provided upon the standard 24 for holding said setting lever in any position of adjustment. As illustrated, said means are formed by providing notches 41, 42, 43, in plate 44, which is secured to the wall 37 of the standard 24, into which notches the setting lever may be placed.

The setting lever is also mounted for swinging movement through a vertical plane whereby it may be lifted out of said notches, and this pivotable mounting may comprise a yoke-like lever supporting member 45, to which the setting lever is pivotally connected by the pivot pin. Said lever supporting member 45 is pivoted to the standard 24 on a horizontal axis, by pivot pins 46 that extend through side walls 37ᵃ of the standard 24 and through the end portions of said lever supporting member 45. Said pivot pins 46 may be held in place by cotter pins as shown.

The co-operating stop members 47, 48, 49, are provided upon the rack bar 28, each of which is arranged to strike against the arm 39 of the setting lever 36 (depending upon its position), to thereby arrest upward movement of the plunger. The stop members 47, 48, are arranged at the sides of the plunger stem, one being on one side and one on the other side thereof, and the stop member 49 is arranged midway therebetween. The setting lever may be moved upon its fulcrum 40 to bring its arm 39 into the path of movement of either one of the three stop members 47, 48, 49, depending upon the quantity of liquid it is desired to measure, and said stop members 47, 48, 49, are spaced apart and properly located upon the rack bar at the proper positions to determine the length of stroke of the plunger, for the predetermined quantity of liquid to be dispensed. For instance, the stop member 47 may be positioned to provide for a stroke which will deliver a pint of liquid, the stop member 48 may be so positioned that a quart will be delivered, and the stop member 49 so that gallon will be delivered, or any other desired, predetermined quantities may be delivered, depending upon the location of said stop members, and the diameter of the measuring cylinder.

In order to accurately measure various predetermined quantities of liquid, adjustment means are provided for accurately positioning the arm 39 of the setting lever, and thereby spacing it from the stop members 47, 48, 49. Said adjustment means comprises adjustment screws 50, 51, 52, there being one corresponding to each stop member 47, 48, 49, and said screws being arranged to be engaged by the arm 39, to form a positive stop therefor at the instant the plunger has displaced the predetermined quantity of the liquid. The screw 50 is centrally located and co-acts with the stop shoulder 49. It is arranged to be engaged my the arm 39 when the latter occupies a central position, namely, one in the path of movement of the stop member 49. The screws 51, 52, are located at the sides of the screw 50 and one or the other is engaged by said arm 39 when it is shifted into alignment with one of the stop members 47, 48. For convenience, the distance between the screws 51, 52, is greater than the throw of the setting lever at that place, and the lever is formed with laterally projecting lugs 54 that will engage with the screws when the lever is shifted to the right or left of its central position.

The adjustment screws 50, 51, 52, are threaded in a cross wall or web 55 of the head 24 and have lock nuts 56 threaded thereon that bear against the web 55 to lock the screws in their adjusted positions. An opening is provided in the top of the bracket or arm 24 for access to said adjustment screws, which opening is closed by a cover plate 68 that rests upon the upper edge of the bracket 24 and has a downwardly projecting lug 69 that bears on the wall or web 55. A screw 70 extends through said cover plate 68 and is threaded in the wall or web 55. The cover plate may be sealed against removal by providing an apertured lug 71 on the cover plate at a place adjacent the head of the screw 70 and by forming an aperture in said screw head, through which apertures may be passed a wire, the ends of which may be secured by a metal seal 72, as is well understood.

The crank 31 may also be locked against movement by providing an apertured ear 73 on the arm 24 (see Fig. 6) and an apertured ear 74 on the crank, which ears may be brought close together, and locked together by an ordinary padlock 75 (see Figs. 1 and 2).

A meter or register 76 may be provided on the standard 24, and connected to and operated by the shaft 30, and may be arranged to indicate, at all times, the amount of liquid discharged from the tank by the measuring and dispensing apparatus. Any of the common and well known meters or registers, operated by a rock shaft, may be employed for this purpose.

In the operation of the device, the crank 31 is locked to the standard except when liquid is to be dispensed, or the lock may be removed except at the close of the day's work, as desired. To measure and dispense a predetermined quantity of liquid, the setting lever 36 is set in the proper notch of the indicating plate 44 and the crank 31 is turned in the proper direction, until the particular stop member of the rack bar, which is in alignment with the arm 39 of the setting lever, encounters and is arrested by said arm. It is understood that the crank turns the pinion 29 which raises the rack bar 28 and stem 17, and therewith the plunger 16, which displaces a predetermined quantity of the liquid above it and draws into the cylinder below it a quantity equal to that discharged. It is also understood that a head of liquid is maintained above the plunger, which fills the measuring cylinder 12, chamber 15, pipe 23 and discharge pipe arm 25, the goose neck discharge spout acting to prevent any discharge of liquid after the plunger reaches the top of any stroke, but acting to retain in the discharge pipe arm 25, any liquid remaining therein. After dispensing the desired amount of liquid, the crank is returned to normal position, thereby lowering the rack bar 28 and therewith the stem 17 and plunger 16. During the downward stroke of the plunger the check valve thereof opens and permits liquid below it, to pass through the valve opening in the plunger to the upper side thereof. The check valve mechanism 20 at the bottom of the pipe 13 prevents any outward escape of the liquid after having once entered the pipe.

At the end of the day's work, or at any desired times, readings may be taken of the meter, to determine how much liquid has been dispensed.

It is to be observed that the parts are reduced to a minimum for accomplishing the desired results; that comparatively little machine work is necessary; that the parts are easily and readily assembled and not likely to get out of order from the usual and rough usage to which devices of this kind are put.

More or less variation of the exact details of construction is possible without departing from the spirit of this invention; we desire, therefore, not to limit ourselves to the exact form of the construction shown and described, but intend, in the following claims, to point out all of the invention disclosed herein.

We claim as new and desire to secure by Letters Patent:

1. A liquid measuring and dispensing apparatus comprising a measuring cylinder having an inlet opening and a discharge opening, a plunger reciprocating in said cylinder, a plunger stem for said plunger, a bearing bracket for the upper end of said stem, a rack bar secured to said stem above said bearing bracket, and having disposed along its length, a plurality of spaced, unaligned stop shoulders, means for operating said rack bar, and oscillatory setting mechanism capable of being interposed in the path of movement of any of said stop shoulders to determine the length of stroke of said plunger, whereby various predetermined quantities of liquid may be discharged from said cylinder.

2. A liquid measuring and dispensing apparatus comprising a measuring cylinder having an inlet opening and a discharge opening, a plunger reciprocating in said cylinder, a plunger stem for said plunger, a bearing bracket for the upper end of said stem, a rack bar secured to said stem above said bearing bracket, and having, disposed along its length, a plurality of spaced, unaligned stop shoulders, means for operating said rack bar, and an adjustable setting lever having an arm capable of being interposed in the path of movement of any of said stop shoulders to determine the length of stroke of said plunger, whereby various predetermined quantities of liquid may be discharged from said cylinder.

3. A liquid measuring and dispensing apparatus comprising a measuring cylinder having an inlet opening and a discharge opening, a plunger reciprocating in said cylinder, a plunger stem for said plunger, a bearing bracket for the upper end of said stem, a rack bar connected with said stem above said bearing bracket, and having, disposed along its length, a plurality of spaced, unaligned stop shoulders, means for operating said rack bar, and a setting lever having an arm movable transversely of said rack bar and capable of being interposed in the path of movement of any of said stop shoulders to determine the length of stroke of said plunger, whereby various predetermined quantities of liquid may be discharged from said cylinder.

4. A liquid measuring and dispensing apparatus comprising a measuring cylinder having an inlet opening and a discharge opening, a plunger reciprocating in said cylinder, a plunger stem for said plunger, a bearing bracket for the upper end of said stem, a rack bar secured to said stem, and having, disposed along its length, a plurality of spaced, unaligned stop shoulders, means for operating said rack bar, a setting lever movable transversely of said rack bar, and means for holding said lever in its various positions of adjustment, said lever having an arm capable of being interposed in the path of movement of any of said stop shoulders to determine the length of stroke of said plunger, whereby various predetermined quantities of liquid may be discharged from said cylinder.

5. A liquid measuring and dispensing apparatus comprising a measuring cylinder having an inlet opening and a discharge opening, a plunger reciprocating in said cylinder, a plunger stem for said plunger, a bearing bracket for the upper end of said stem, a rack bar secured to said stem above said bearing bracket and projecting down therefrom, and having, disposed along its length, a plurality of spaced, unaligned stop shoulders, means for operating said rack bar, a tiltable setting lever fulcrumed upon an axis parallel with said rack bar, whereby it may be moved transversely thereof, and a notched plate with which said lever engages, said lever having an arm capable of being interposed in the path of movement of any of said stop shoulders to determine the length of stroke of said plunger, whereby various predetermined quantities of liquid may be discharged from said cylinder.

6. A liquid measuring and dispensing apparatus comprising a measuring cylinder having an inlet opening and a discharge opening, a plunger reciprocating in said cylinder, a plunger stem for said plunger, a bearing bracket for the upper end of said stem, a rack bar connected with said stem above said bearing bracket, and having, disposed along its length, a plurality of spaced unaligned stop shoulders, means for operating said rack bar, a tiltable setting lever having a single arm movable transversely of said rack bar, and regulating screws acting as stationary stops for said setting lever, the latter capable of being interposed in the path of movement of any of said stop shoulders to determine the length of stroke of said plunger, whereby various predetermined quantities of liquid may be discharged from said cylinder.

7. In a liquid measuring and dispensing apparatus, a plunger pump, including its plunger stem, a bracket arm projecting up from said pump and having a bearing at its upper end through which said plunger stem extends, a bar secured to said plunger stem above said bearing and projecting down below the same and having a plurality of spaced stop members thereon, and a setting lever having a single arm movable into the path of movement of any of said stop members.

8. In a liquid measuring and dispensing apparatus, a hollow standard having an opening therein for access to its interior, a setting lever in said standard and having an end projecting out therefrom, said lever being shiftable to various positions, adjustable regulating screws cooperating with said lever to form stops therefor, said regulating screws being accessible through said opening and a sealed cover for said opening.

ANDREW D. WYCKOFF.
HOWARD P. de CORREVONT.